United States Patent [19]

McGuire

[11] Patent Number: 5,524,301
[45] Date of Patent: Jun. 11, 1996

[54] DISPOSABLE TOILET

[76] Inventor: David McGuire, P.O. Box 129, Apache Junction, Ariz. 85217

[21] Appl. No.: 376,032

[22] Filed: Jan. 20, 1995

[51] Int. Cl.⁶ .................................................. A47K 11/02
[52] U.S. Cl. ........................................ 4/460; 4/449; 4/476
[58] Field of Search .............................. 4/449, 476, 483, 4/484

[56] References Cited

U.S. PATENT DOCUMENTS

| | | | |
|---|---|---|---|
| 2,849,726 | 9/1958 | Vay | 4/476 |
| 2,912,702 | 11/1959 | MacKenzie | 4/476 |
| 3,159,848 | 12/1964 | Arndt | 4/476 |
| 5,048,130 | 9/1991 | Brotman et al. | 4/476 X |

Primary Examiner—Charles E. Phillips
Attorney, Agent, or Firm—Snell & Wilmer

[57] ABSTRACT

A lightweight, portable toilet which is disposable after use. The apparatus is comprised of sturdy biodegradable, environmentally safe corrugated paper board which is capable of being incinerated or buried in the earth's surface after use. The disposable toilet is comprised of a seat member which is placed over the top of a substantially rectangular base member. The seat member contains a rounded rectangular opening. The bottom of the base member is open so as to allow human waste excretions to fall into a pre-excavated hole in the earth's surface located directly underneath the toilet. After use, the toilet can be moved to a new location or disposed of and the hole covered with soil.

11 Claims, 2 Drawing Sheets

DISPOSABLE TOILET

FIELD OF THE INVENTION

The present invention relates to a lightweight, portable toilet for outdoor use which is capable of being disposed after use. The device of the present invention is based on the principle of forming a collapsible rectangular base member and a collapsible seat member and thereafter positioning the member which forms the seat over the top of the rectangular base member to form a disposable toilet. The underneath side of the rectangular base member remains open to allow human waste excretions to fall into a pre-excavated hole in the earth's surface located directly under the toilet. The toilet device of the present inventions construction is collapsed for easy storage and portability to outdoor camping sites. The toilet is composed of a biodegradable, environmentally safe corrugated paper board which allows the entire device to be incinerated when placed into a campfire or buried in the earth's surface.

BACKGROUND OF THE INVENTION

The conventional toilet, as we know it today, is most commonly found as a permanent structure formed from steel, porcelain or some other sturdy composition. This type of structure is typically found in private, enclosed spaces in homes and businesses. One of the problems associated with this type of permanent structure is the difficulty for the user to carry the device to remote locations because of the weight and size of the device. Remote locations, such as campsites, parks and hiking trails generally do not have their own toilets available. People who enjoy camping at sites far away from established bathrooms cannot enjoy the convenience of a sturdy toilet for support.

In general, the conventional toilet has a central bowl that serves as a receptacle for human waste excretions. The user is supported on a widened frame which is positioned on the outside ring of the bowl. The bowl is filled with water and is permanently affixed above a drain. The water and excretions are ejected into a drain located at the bottom of the bowl through a flushing action. In general, the typical toilet is composed of heavy steel or porcelain which is expensive to purchase and difficult to transport.

In addressing the problem of portability there exists the desire to construct a toilet for use while camping, hiking, hunting or participating in other activities in remote outdoor locations. In doing so, one is faced with looking to the current products of this type on the market. Many of the products on the market today are large permanent structures, such as the previously mentioned steel or porcelain toilet. These type of structures are not suited for outdoor use because the weight of the structures prohibit the user from carrying the device to a remote location. While there exist products on the market which are portable, there remains a need for a toilet which is in addition disposable, collapsible, biodegradable and easy to transport. Many of the now existing portable toilets contain removable containers for collection of the waste. When full, the container must be manually emptied or disposed of. For those types of containers which require manual emptying, there exist an increased risk in the possibility of contact with the excretions and associated bacteria. In addition, many individuals fail to properly dispose of the used container in a waste receptacle, leading to an increase in unsightly and unsanitary campsites.

The device as disclosed is comprised of rigid, lightweight, corrugated paper board which is disposable after use either in a proper waste receptacle, by incineration in a campfire or by burying in the earth's surface. The present invention provides for an interlocking structure assembled from, flat die-cut paper board pieces which are shipped to or purchased flat by the user who at time of assembly folds the pieces along scoring and simply assembles the toilet by interlocking the support members. The device of the present invention is based on the principle of folding the paper board to form the four sides of the collapsible rectangular base member upon which a separately formed seat member is placed. The seat member when placed over the top of the base member forms the disposable toilet of the present invention. The seat member contains a substantially rectangular opening to allow the user to be supported by the side aspects of the seat member, thus being positioned directly over the rectangular opening. The preferred embodiment of the disposable toilet device may be designed to support up to two-hundred and seventy-five pounds of weight dependent upon materials used. The underneath side of the rectangular base member is open to allow for the human waste excretions to fall into a pre-excavated hole in the earth's surface located directly beneath the toilet. After use, the toilet can be alternatively moved to a nearby location for continued use and the hole covered with soil or in the alternative the entire disposable toilet can be incinerated in a campfire or buried in the earth's surface. Thus, the toilet may be moved after each use so there is no accumulation of waste nor the need to continually empty storage containers. The disposable toilet of the present invention is lightweight and capable of being strapped to the average back pack for transportation to campsites, etc. The toilet is comprised of an environmentally safe, biodegradable corrugated paper board and water soluble glue which allows the entire device to be incinerated when placed into a campfire for disposal or buried in the earth's surface. Incineration of the disposable toilet after use provides for an easy and safe sanitary method of disposal.

An alternative embodiment would allow for the positioning of a collection bag, containing sand or similar granular clay-like matter, over the edge of the rectangular base member to enable collection of the human waste excretion. The bag would preferably have a square shaped upper and lower aspect to better accommodate the shape of the disposable toilet and serve the intended purpose.

SUMMARY OF THE INVENTION

Accordingly, it is a broad aspect of the present invention to provide for a lightweight, portable toilet which is disposable after use and biodegradable.

It is a further object of the present invention to provide a disposable toilet made of sturdy corrugated paper board to support the weight of various users.

It is a further object of the present invention to provide a biodegradable, environmentally safe disposable toilet.

It is a further object of the present invention to provide a disposable toilet that allows human waste excretions to fall into a pre-excavated hole in the earth's surface located directly below the toilet.

It is a further object of the present invention to provide a disposable toilet that allows human waste excretions to collect in an attached bag.

It is a still further object of the present invention to provide a portable, disposable toilet that can be moved to a nearby location after use without the sanitary problems of accumulation of excretions or the need to empty storage containers.

It is a still further object of the present invention to provide a toilet that can be incinerated in a campfire for sanitary disposal or buried in the earth's surface.

It is a still further object of the present invention to provide a disposable toilet that when collapsed, allows for it to be strapped to the average backpack for transportation to remote locations.

These and other objects, features and advantages of the present invention will become more apparent to those skilled in the art from the following more detailed description of the non-limiting preferred embodiment of the invention taken with reference to the accompanying Figures.

BRIEF DESCRIPTION OF THE DRAWINGS

Briefly summarized, a preferred embodiment of the invention is described in conjunction with the illustrative disclosure thereof in the accompanying drawings, in which.

DETAILED DESCRIPTION OF THE PREFERRED EMBODIMENT

Referring particularly to the drawings, there is shown the elements of the device of the present invention. In the Figures, there is shown the toilet device 10 of the present invention which comprises a plurality of biodegradable, environmentally safe die-cut corrugated paper board pieces, having rectangular flanges and reciprocating slots, thus capable of frictional engagement so as to construct the disposable toilet 10 of the present invention. Assembly of the disposable toilet does not require the use of tools.

Figure 1:
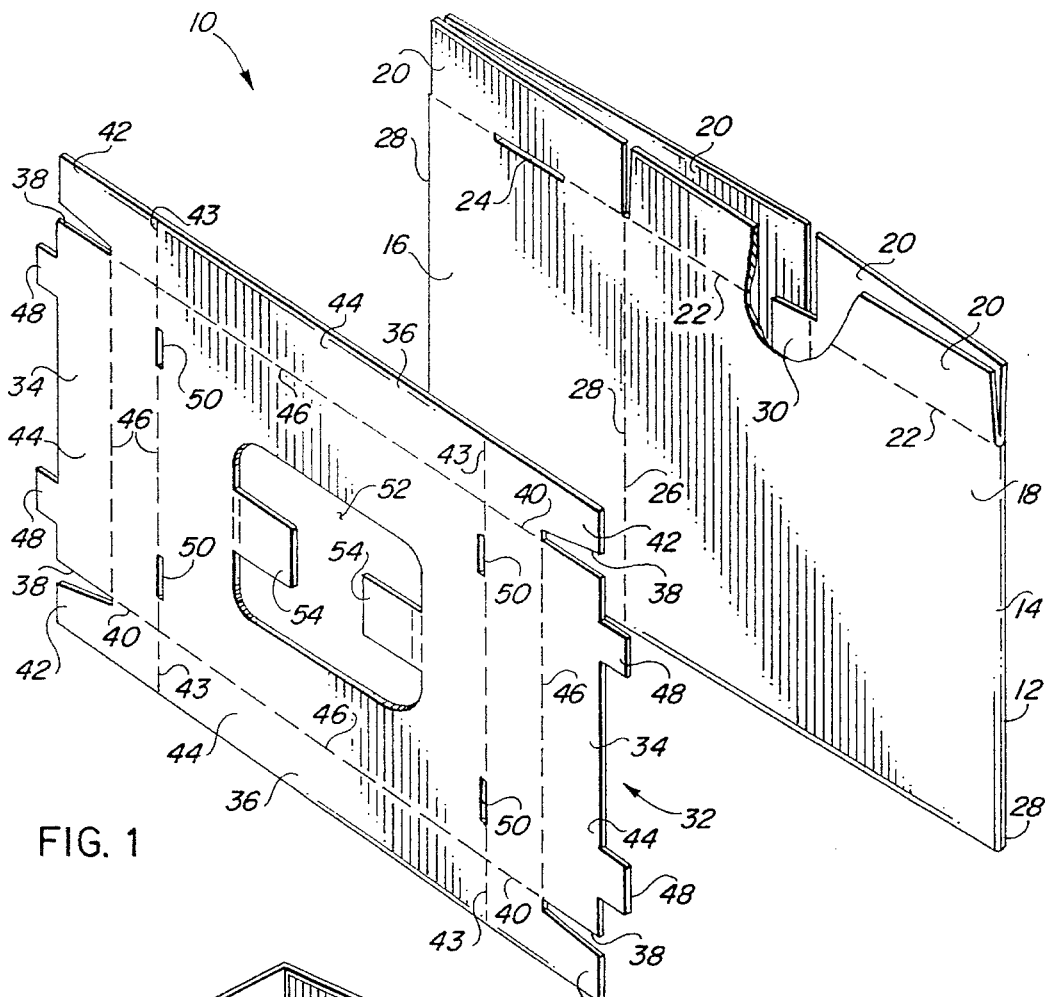
FIG. 1 is a perspective view showing the preferred embodiment of the present invention in its collapsed form.

The preferred embodiment of the disposable toilet device 10 as disclosed and shown in FIG. 1 comprises a collapsible rectangular base member 12 and a collapsible seat member 32. The rectangular base member 12 is formed from single die-cut piece of corrugated paper board 14 having a plurality of sides comprising a first short side 16, a second short side (not shown), a first long side 18 and a second long side (not shown). A plurality of rectangular flanges 20 extend outwardly from the top edge of said plurality of sides. The piece of die-cut corrugated paper board 14 which forms the rectangular base member 12 has a series of horizontal score lines 22 located approximately 2½ inches below the plurality of flange 20 edges. The horizontal scores 22 allow for ease in folding the plurality of flanges 20 at ninety degree angles directed toward the interior aspect of the rectangular base member 12. The rectangular base member 12 contains a plurality of horizontal slots 24, positioned parallel to the top edge and within the first short side 16 and the second short side (not shown). Said horizontal slots 24 are approximately 4¼ inches in length and ½ inch in width, and are cut into the rectangular base member 12 along the score line 22, horizontally centered on the first short side 16 and second short side (not shown). A series of vertical scores 26 are formed in the rectangular base member 12 to allow for ease in folding the piece of die-cut corrugated paper board 14 at ninety degree angles to form the vertical sidewalls of the rectangular base member 12. The vertical scores 26, when bent, result in the formation of the rectangular base member 12, having a plurality of formed ninety-degree corners 28, wherein the first short side 16 overlaps 30 the first long side 18 at at least one of said plurality of ninety degree corners 28 to form the rectangular base member 12. A water soluble glue is used to adhere the sides at the point of overlap 30.

The collapsible seat member 32 is formed from a second piece of die-cut corrugated paper board having two short sides 34 and two long sides 36. A plurality of notches 38, approximately 3 inches in length and ⅝ inches in width, are die-cut into each of the two short sides 34 at a distance of 2 inches from each edge of the long sides 36 A 2¾ inch cut 40 extends beyond the proximal end of each notch 38 parallel to the long sides 36. The plurality of notches 38 and cuts 40 formed in the seat member 32 allow for the formation of a plurality of flanges 42 which can be folded along a score line 43 at ninety degree angles parallel to the short sides 34, and perpendicular to the long sides 36. A plurality of rectangular flanges 44 extend outwardly from the edges of the plurality of short sides 34 and long sides 36 to further allow for the formation of the sidewalls of the collapsible seat member 32. A series of horizontal scores 46, located approximately 2½ inches below the flange 44 edges and parallel to the respective sides, allow for ease in folding the flanges 44 toward the interior aspect of the seat member A plurality of tabs 48, approximately 1¾ inches in length project outwardly approximately ¾ inch from each short side 34. A plurality of reciprocating slots 50, approximately 2 inches in length and ⅜ inches in width, are located approximately 5⅝ inches interior the edge of said short side 34, thus allowing for interlocking of the flanges 48 located on the short sides 34 when folded toward the interior aspect of the seat member 32. A substantially rectangular opening 52, approximately 8 inches in width and 11½ inches in length, is centrally located within the horizontal plane of the seat member 32. Two projecting flaps 54, approximately 3½ inches in width and 4 inches in length, protrude outwardly toward the center of the rectangular opening 52 having scored lines formed thereon to permit ease in folding toward the interior aspect of the disposable toilet 10.

The seat member 32 when completely setup rests upon the top edge of the rectangular base member 12. The flaps 54 of the seat member 32 are folded into the interior aspect of the rectangular base member 12 and interlocked into the reciprocating slots 24 of the rectangular base member 12 to rigidly secure the seat member 32 to the base member 12. The disposable toilet 10 is then placed over a pre-excavated hole in the earth's surface.

Figure 2:
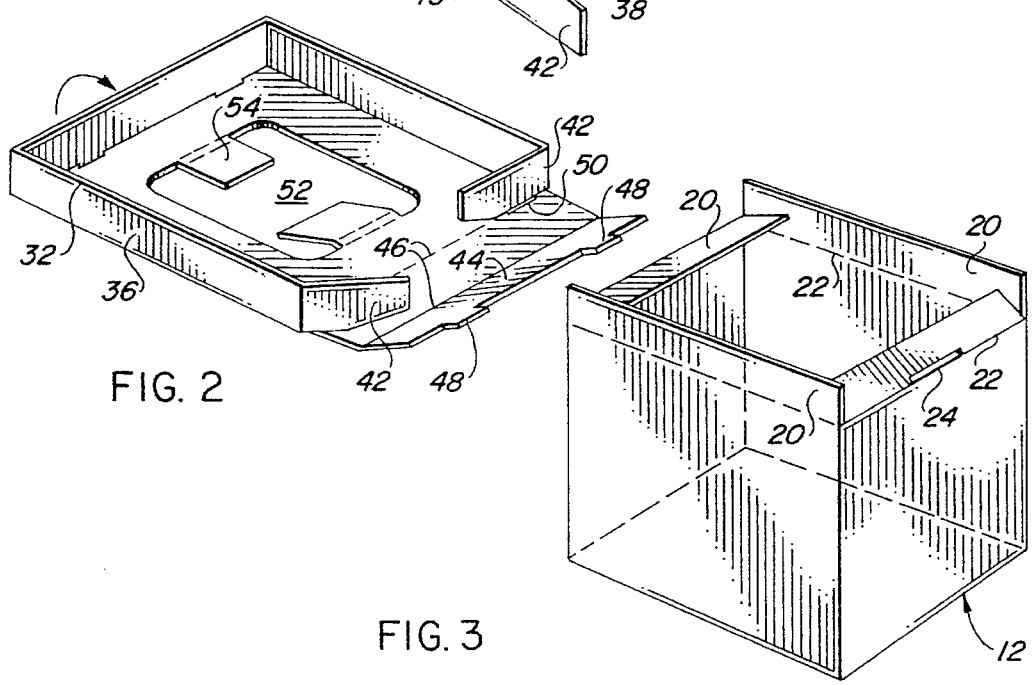
FIG. 2 is a perspective view showing the preferred embodiment of the partially folded seat member of the present invention.

FIG. 2 shows a perspective view of the preferred embodiment of the partially folded seat member 32 of the present invention. Shown is the seat member 32 with three sides in the completed setup state so as to form three sidewalls perpendicular to the plane of the rectangular opening 52. In forming the fourth sidewall of the seat member 32, the flanges 42 are folded along score lines 43 perpendicular to the long side 36 and positioned parallel to the short side 34. The flange 44 located on the short side 34 is then folded along score lines 46 towards the interior aspect of the seat member 32, over flanges 42. Tabs 48 are interlocked into the reciprocating slots 50 to further stabilize the seat member 32 in its completed setup form.

Figure 3:
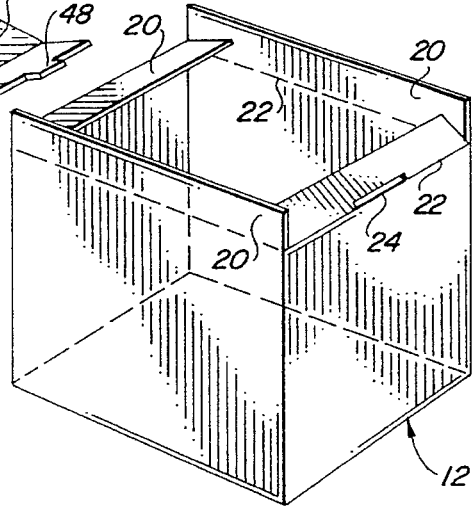
FIG. 3 is a perspective view showing the preferred embodiment of the partially folded rectangular base member of the present invention.

A perspective view of the preferred embodiment of the partially folded rectangular base member 12 of the present invention in its completed setup form is shown in FIG. 3. The plurality of rectangular flanges 20 are folded along score line 22 toward the interior aspect of the rectangular base member 12. The horizontal slots 24, of the rectangular base member 12, allow for interlocking of flaps 54 of the rectangular opening 52 of the seat member 32 to the rectangular base member 12.

Figure 4:
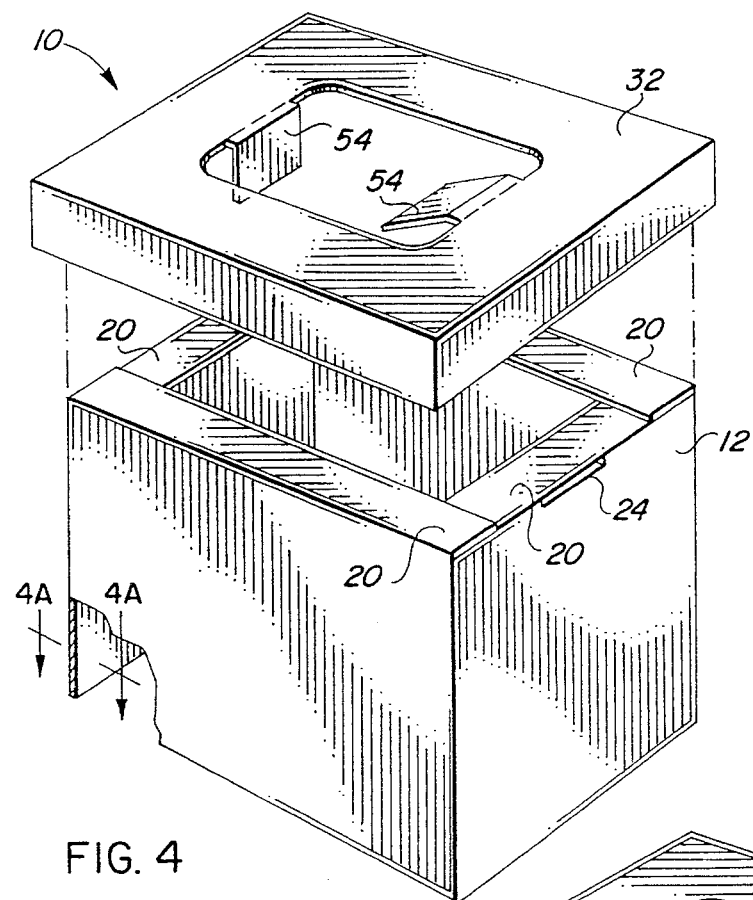
FIG. 4 is an exploded perspective view showing the completed setup form of the preferred embodiment of the present invention.
Figure 4A:
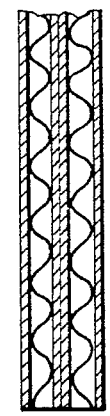
FIG. 4A is a partial horizontal cross sectional view taken along line 4A—4A of FIG. 4, showing the corrugation of the paper board of the present invention.

FIG. 4 depicts an exploded perspective view showing the completed setup form of the preferred embodiment of the present invention. Shown is the rectangular base member 12 having rectangular flanges 20 folded toward the interior aspect of the rectangular base member 12. The seat member 32 is placed directly on the rectangular base member 12 and the interlocking flaps 54 of the seat member 32 are interlocked into the horizontal slots 24 of the rectangular base member.

A cross-sectional view taken along line 4A—4A of FIG. 4 shows the double-fluted corrugation composition of the paper board of the present invention.

Figure 5:
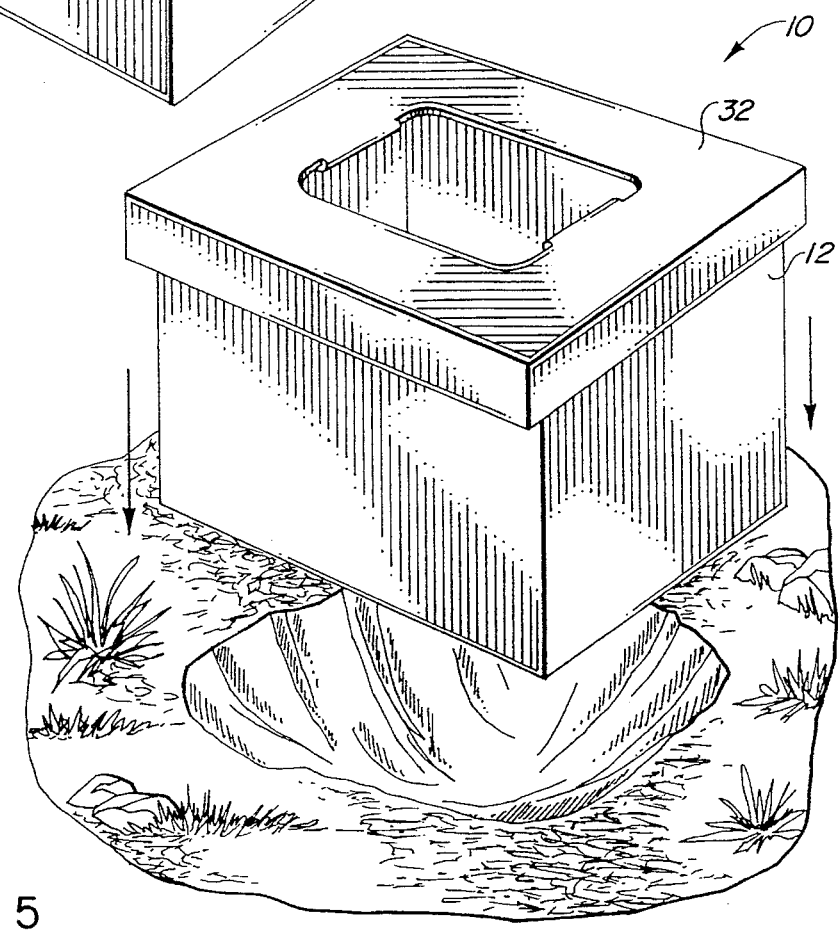
FIG. 5 is a perspective view showing the placement of the preferred embodiment of the present invention in relation to a pre-excavated hole in the earth's surface.

Placement of the completely setup disposable toilet 10 of the present invention is shown in FIG. 5 in perspective view. The disposable toilet 10 is shown placed directly over a pre-excavated hole 56 to allow for the sanitary deposit of human waste excretions into the earth's surface.

An alternative embodiment of the present invention allows for the incorporation and use of a bag which is positioned over the top edge of the rectangular base member 12 to collect the human waste excretions. The bag would preferably contain sand or similar clay-like matter to act as an absorbent material.

From the above it is apparent that the present invention discloses a portable, disposable toilet assembly which can be easily and simply constructed from a minimum number of parts which interlock to form a rigid toilet structure. The disposable toilet of the present invention is constructed from flat pieces of corrugated paper board to form a disposable toilet that can be shipped flat to a retailer or user who completes the assembly in a few simple operations. The limited number of pieces reduces the weight and cost of producing the disposable toilet, but the particular assemblage of the parts provides the necessary strength along the sides aspects of the seat member to support the user. The disposable toilet may be varied in strength to support loads of varying weights.

From the above description of the preferred embodiment, it is apparent that the present invention provides a disposable, biodegradable toilet which is easily assembled and disposed of by incinerating or burying it in the earth's surface. The initial flat form provides for easy storage, shipping and handling, yet the construction is simple at time of use.

What is claimed is:

1. A disposable toilet device comprising:
   a base member, comprising at least one die-cut sheet of rigid material, adapted to be folded, thereby defining a planar aspect of said seat member, bordered by a plurality of downwardly projecting sidewalls;
   a seat member, comprising at least one die-cut sheet of rigid material, adapted to a be folded, thereby defining a planar aspect of said seat member, bordered by a plurality of downwardly projecting sidewalls;
   a central opening defined in said planar aspect of said seat member, said central opening having at least two flaps projecting inwardly from a perimeter of said central opening; and
   a slot in the top edge of at least two sidewalls for receiving said at least two projecting flaps of said seat member in order to secure said base member to said seat member, thereby forming a substantially rigid structure.

2. The toilet device of claim 1, wherein said base member further comprises a plurality of substantially rectangular flanges projecting outwardly from said top edge of said base member.

3. The toilet device of claim 2, wherein said base member further comprises a plurality of score lines thereon to facilitate folding said sheet of rigid material to form a substantially rectangular periphery of sidewalls, thereby defining said interior hollow space.

4. The toilet device of claim 1, wherein said seat member further comprises a plurality of substantially rectangular flanges formed on a plurality of edges of said sheet of rigid material, thereby forming said plurality of downwardly projecting sidewalls.

5. The toilet device of claim 4, wherein said seat member further comprises a plurality of score lines thereon, to facilitate folding said sheet of rigid material to form said plurality of downwardly projecting sidewalls.

6. The toilet device of claim 4, wherein said central opening defined in said planar aspect of said seat member is substantially rectangular in form.

7. The toilet device of claim 6, wherein said means for interlocking said seat member to said top edge of said base member further comprises a plurality of reciprocating slots formed in said base member for receipt of said inwardly projecting flaps formed in said central opening of said seat member.

8. The toilet device of claim 1, wherein said rigid material is comprised of corrugated paper board.

9. The toilet device of claim 8, wherein said base member and said seat member are formed by cutting, scoring and bending flat pieces of said corrugated paper board.

10. A method of constructing a disposable toilet device comprising:
   cutting out at least one base member and at least one seat member from a flat piece of rigid material, each comprising a substantial rectangular form and having a plurality of rectangular flanges extending from at least one edge of said form;
   scoring at least one side of said form to produce a plurality of score lines;
   folding said base member along said plurality of score lines to form a substantially rectangular form thereby defining a hollow space;
   folding said flanges of said base member, formed along said at least one edge of said rectangular form, along said plurality of score lines, toward said interior hollow space;
   cutting a central opening within said seat member such that said central opening includes at least two inwardly projecting flanges extending from a perimeter of said opening;
   folding said flanges of said seat member along said plurality of score lines to form a plurality of sidewalls projecting downward from a planar aspect of said seat member;

cutting at least two slots in a top perimeter of said base member to coincide with said at least two inwardly projecting flanges of the seat member;

positioning said seat member, with said sidewalls projecting downward, on said edge of said base member;

interlocking said at least two inwardly projecting flanges of said seat member within said at least two slots of said base member to form said toilet device; and positioning said toilet device over a pre-excavated hole in the earth's surface.

11. The method of forming a toilet device of claim 10, wherein said step of interlocking said seat member to said base member comprises positioning a plurality of flaps projecting from said seat member into a plurality of reciprocating slots formed on said base member.

\* \* \* \* \*

UNITED STATES PATENT AND TRADEMARK OFFICE
CERTIFICATE OF CORRECTION

PATENT NO. : 5,524,301
DATED : June 11, 1996
INVENTOR(S) : David McGuire

It is certified that error appears in the above-indentified patent and that said Letters Patent is hereby corrected as shown below:

Col. 6, line 32, "6" should read "1"

Signed and Sealed this

Tenth Day of September, 1996

Attest:

BRUCE LEHMAN

*Attesting Officer*     *Commissioner of Patents and Trademarks*